United States Patent
Sohn et al.

(10) Patent No.: US 10,829,627 B2
(45) Date of Patent: Nov. 10, 2020

(54) POLYMER COMPOUND, METHOD FOR PREPARING MODIFIED AND CONJUGATED DIENE-BASED POLYMER USING THE SAME, AND MODIFIED AND CONJUGATED DIENE-BASED POLYMER

(71) Applicant: LG Chem, Ltd., Seoul (KR)

(72) Inventors: Hae Sung Sohn, Daejeon (KR); He Seung Lee, Daejeon (KR); No Ma Kim, Daejeon (KR)

(73) Assignee: LG Chem, Ltd. (KR)

( * ) Notice: Subject to any disclaimer, the term of this patent is extended or adjusted under 35 U.S.C. 154(b) by 232 days.

(21) Appl. No.: 15/749,195

(22) PCT Filed: Dec. 22, 2016

(86) PCT No.: PCT/KR2016/015106
§ 371 (c)(1),
(2) Date: Jan. 31, 2018

(87) PCT Pub. No.: WO2017/111499
PCT Pub. Date: Jun. 29, 2017

(65) Prior Publication Data
US 2018/0223088 A1    Aug. 9, 2018

(30) Foreign Application Priority Data

Dec. 24, 2015   (KR) ......... 10-2015-0186340
Dec. 21, 2016   (KR) ......... 10-2016-0176016

(51) Int. Cl.
| | | |
|---|---|---|
| *C08L 25/10* | (2006.01) |
| *C08F 212/08* | (2006.01) |
| *B60C 1/00* | (2006.01) |
| *C08F 8/44* | (2006.01) |
| *C08F 220/00* | (2006.01) |
| *C08G 81/02* | (2006.01) |
| *C08F 236/06* | (2006.01) |
| *C08F 220/28* | (2006.01) |
| *C08C 19/25* | (2006.01) |
| *C08F 236/10* | (2006.01) |
| *C08F 212/14* | (2006.01) |
| *C08F 220/22* | (2006.01) |
| *C08F 12/18* | (2006.01) |
| *C08F 12/28* | (2006.01) |

(52) U.S. Cl.
CPC ............... *C08L 25/10* (2013.01); *B60C 1/00* (2013.01); *B60C 1/0016* (2013.01); *C08C 19/25* (2013.01); *C08F 8/44* (2013.01); *C08F 212/08* (2013.01); *C08F 212/14* (2013.01); *C08F 220/00* (2013.01); *C08F 220/22* (2013.01); *C08F 220/28* (2013.01); *C08F 236/06* (2013.01); *C08F 236/10* (2013.01); *C08G 81/022* (2013.01); *C08F 12/18* (2013.01); *C08F 12/28* (2013.01); *C08F 2500/01* (2013.01); *C08F 2500/03* (2013.01)

(58) Field of Classification Search
None
See application file for complete search history.

(56) References Cited

U.S. PATENT DOCUMENTS

| | | | | |
|---|---|---|---|---|
| 4,067,929 A | * | 1/1978 | Willis ............... | C08F 297/04 525/122 |
| 4,115,478 A | * | 9/1978 | Alsberg ............ | C08F 279/06 525/314 |
| 4,397,994 A | | 8/1983 | Takeuchi et al. | |
| 4,734,351 A | * | 3/1988 | Kitatani ............ | G03G 9/131 430/114 |
| 5,093,430 A | * | 3/1992 | Sakagami ......... | C08F 297/046 525/314 |
| 2004/0122156 A1 | | 6/2004 | Yoshida et al. | |
| 2008/0009570 A1 | | 1/2008 | Miyazaki | |
| 2012/0270997 A1 | | 10/2012 | Tanaka et al. | |
| 2016/0053059 A1 | | 2/2016 | Kim et al. | |

FOREIGN PATENT DOCUMENTS

| | | |
|---|---|---|
| JP | S57171796 A | 10/1982 |
| JP | H11323058 A | 11/1999 |
| JP | H11335433 A | 12/1999 |
| JP | 2004107384 A | 4/2004 |
| JP | 2009086345 A | 4/2009 |
| JP | 2010070615 A | 4/2010 |
| KR | 20140127716 A | 11/2014 |
| KR | 20150134035 A | 12/2015 |

(Continued)

OTHER PUBLICATIONS

Extended European Search Report including Written Opinion for Application No. EP16879366.9 dated May 24, 2018.
Yukio Nagasaki et al., "Design of Biointerface by Nonequilibrium Atmospheric Plasma Jets—Approach from Plasma Susceptible Polymers—", Journal of Photopolymer Science and Technology, May 16, 2008, vol. 21, No. 2,pp. 267-270, XP055474719.
Search report from International Application No. PCT/KR2016/015106, dated Apr. 19, 2017.

(Continued)

*Primary Examiner* — Christopher M Rodd
(74) *Attorney, Agent, or Firm* — Lerner, David, Littenberg, Krumholz & Mentlik, LLP

(57) ABSTRACT

The present invention relates to a polymer compound used as a polymer modifier, a conjugated diene-based polymer including a functional group derived therefrom, and a method for preparing a modified and conjugated diene-based polymer using the polymer compound. A rubber modifier compound obtained therefrom is used as a modifier for rubber, particularly, as a modifier of a conjugated diene-based polymer and is bonded to a chain of the conjugated diene-based polymer to easily introduce a functional group having affinity with a filler.

18 Claims, No Drawings

(56) References Cited

FOREIGN PATENT DOCUMENTS

| WO | 2009050944 A1 | 4/2009 |
|---|---|---|
| WO | 2011049180 A1 | 4/2011 |

OTHER PUBLICATIONS

Hien T. T. Duong, et al., "Organic Nitrate Functional Nanoparticles for the Glutathione-Triggered Slow Release of Nitric Oxide." Journal of Polymer Science, Part A., Polymer Chemistry, received Mar. 28, 2014; accepted Apr. 12, 2014; published online May 4, 2014, vol. 52, No. 5, pp. 2099-2103.

* cited by examiner

POLYMER COMPOUND, METHOD FOR PREPARING MODIFIED AND CONJUGATED DIENE-BASED POLYMER USING THE SAME, AND MODIFIED AND CONJUGATED DIENE-BASED POLYMER

CROSS-REFERENCE TO RELATED APPLICATIONS

The present application is a national phase entry under 35 U.S.C. § 371 of International Application No. PCT/KR2016/015106 filed Dec. 22, 2016, which claims priority from Korean Patent Application Nos. 10-2015-0186340, filed Dec. 24, 2015, and Korean Patent Application No. 10-2016-0176016, filed Dec. 21, 2016, all of which are incorporated herein by reference.

TECHNICAL FIELD

The present invention relates to a polymer compound useful as a polymer modifier, a modified and conjugated diene-based polymer including a functional group which is derived from the polymer compound, and a method for preparing a modified and conjugated diene-based polymer using the polymer compound.

BACKGROUND ART

According to the recent demand for cars having a low fuel consumption ratio, a conjugated diene-based polymer having modulational stability represented by wet skid resistance as well as low rolling resistance, and excellent abrasion resistance and tensile properties is required as a rubber material for tires.

In order to reduce the rolling resistance of tires, there is a method of reducing hysteresis loss of vulcanized rubber, and rebound resilience at 50° C. to 80° C., tan δ, Goodrich heating, or the like is used as an evaluation index of the vulcanized rubber. That is, it is desirable to use a rubber material having high rebound resilience at the above temperature or a low tan δ value or Goodrich heating.

Natural rubbers, polyisoprene rubbers, or polybutadiene rubbers are known as rubber materials having low hysteresis loss, but these rubbers have a limitation of low wet skid resistance. Thus, recently, conjugated diene-based (co)polymers, such as styrene-butadiene rubbers (hereinafter, referred to as "SBR") and butadiene rubbers (hereinafter, referred to as "BR"), are prepared by emulsion polymerization or solution polymerization to be used as rubbers for tires. Among these polymerization methods, the greatest advantage of the solution polymerization in comparison to the emulsion polymerization is that the vinyl structure content and the styrene content, which specify physical properties of the rubber, may be arbitrarily adjusted and its molecular weight and physical properties may be controlled by coupling or modification. Thus, the SBR prepared by the solution polymerization is widely used as a rubber material for tires because it is easy to change a structure of the finally prepared SBR or BR, and movement of chain terminals may be reduced and a coupling force with a filler such as silica and carbon black may be increased by coupling or modification of the chain terminals.

In a case where the solution-polymerized SBR is used as the rubber material for tires, since a glass transition temperature of the rubber is increased by increasing the vinyl content in the SBR, physical properties such as running resistance and braking force, required for tires may not only be controlled, but fuel consumption may also be reduced by appropriately adjusting the glass transition temperature.

The solution-polymerized SBR is prepared by using an anionic polymerization initiator and is being used by coupling or modifying chain terminals of the polymer thus formed using various modifiers.

For example, U.S. Pat. No. 4,397,994 discloses a method of coupling active anions of the chain terminals of a polymer obtained by polymerizing styrene-butadiene using alkyllithium which is a monofunctional initiator in a non-polar solvent, using a binder such as a tin compound.

Meanwhile, carbon black and silica are being used as a reinforcing filler of a tire tread, wherein, in a case where the silica is used as the reinforcing filler, hysteresis loss may be low and wet skid resistance may be improved. However, since the silica having a hydrophilic surface has a low affinity with rubber in comparison to the carbon black having a hydrophobic surface, dispersibility may be poor, and, thus, there is a need to use a separate silane coupling agent to improve the dispersibility or provide coupling between the silica and the rubber.

Therefore, a method of introducing a functional group having an affinity or reactivity with the silica into the terminals of rubber molecules is being performed, but its effect is insufficient.

Accordingly, the development of rubbers having high affinity with a filler such as silica is required.

DISCLOSURE OF THE INVENTION

Technical Problem

The present invention has been devised in consideration of the above-mentioned problems, and an object of the present invention is to provide a polymer compound for modifying rubber, which may provide a functional group satisfying the object.

Another object of the present invention is to provide a modified and conjugated diene-based polymer including a functional group derived from the polymer compound.

Still another object of the present invention is to provide a method for preparing a modified and conjugated diene-based polymer using the polymer compound for modifying rubber.

Technical Solution

To solve the above-described tasks, the present invention provides a polymer compound comprising a constituent unit represented by the following Formula 1:

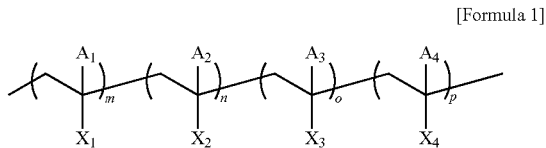

[Formula 1]

in Formula 1, $X_1$, $X_2$, $X_3$ and $X_4$ are each independently a derived substituent from a compound containing $C_{1-10}$alkyl, amine, ester, nitrile, benzophenone, acryl, vinyl, styrene, styrenacryl, or aryl, which is unsubstituted or substituted with at least one substituent selected from the group consisting of halogen, $C_{1-20}$alkyl, $C_{3-20}$cycloalkyl, and $C_{6-30}$aryl, m, n, o and p represent a molar ratio of each repeating unit, where m+n+o+p is 100, m is 1 to 50,
n is 0 to 50,
o is 1 to 50,
p is 1 to 70, and
$A_1$ to $A_4$ are each independently a hydrogen atom, or $C_{1-3}$alkyl.

In addition, there is provided a modified and conjugated diene-based polymer comprising a functional group derived from a polymer compound comprising a constituent unit represented by the following Formula 1:

[Formula 1]

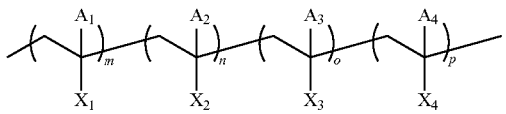

in Formula 1, $X_1$, $X_2$, $X_3$ and $X_4$ are each independently a derived substituent from a compound containing $C_{1-10}$alkyl, amine, ester, nitrile, benzophenone, acryl, vinyl, styrene, styrenacryl, or aryl, which is unsubstituted or substituted with at least one substituent selected from the group consisting of halogen, $C_{1-20}$alkyl, $C_{3-20}$cycloalkyl, and $C_{6-30}$aryl, m, n, o and p represent a molar ratio of each repeating unit, where m+n+o+p is 100, m is 1 to 50,
n is 0 to 50,
o is 1 to 50,
p is 1 to 70, and
$A_1$ to $A_4$ are each independently a hydrogen atom, or $C_{1-3}$alkyl.

Further, there is provided a method for preparing a modified and conjugated diene-based polymer, comprising: 1) polymerizing conjugated diene-based monomers, or an aromatic vinyl-based monomer and a conjugated diene-based monomer in the presence of an organo-alkali metal compound in a hydrocarbon solvent to prepare an active polymer in which an alkali metal is bonded to at least one terminal thereof; 2) reacting the active polymer with a polymer compound comprising a constituent unit represented by the following Formula 1 to obtain a first modified polymer; and 3) reacting the first modified polymer with a silane-based compound:

[Formula 1]

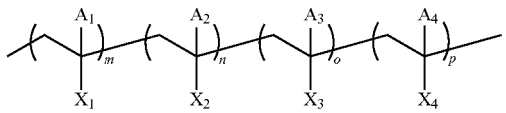

in Formula 1, $X_1$, $X_2$, $X_3$ and $X_4$ are each independently a derived substituent from a compound containing $C_{1-10}$alkyl, amine, ester, nitrile, benzophenone, acryl, vinyl, styrene, styrenacryl, or aryl, which is unsubstituted or substituted with at least one substituent selected from the group consisting of halogen, $C_{1-20}$alkyl, $C_{3-20}$cycloalkyl, and $C_{6-30}$aryl, m, n, o and p represent a molar ratio of each repeating unit, where m+n+o+p is 100, m is 1 to 50,
n is 0 to 50,
o is 1 to 50,
p is 1 to 70, and
$A_1$ to $A_4$ are each independently a hydrogen atom, or $C_{1-3}$alkyl.

Advantageous Effects

The polymer compound containing a constituent unit represented by Formula 1 according to the present invention is used as a modifier for rubber, specifically a modifier of a conjugated diene-based polymer to be bonded to a chain of the conjugated diene-based polymer to provide a functional group.

In the modified and conjugated diene-based polymer according to the present invention, a functional group derived from a polymer compound containing a constituent unit represented by Formula 1 and a functional group derived from a silane-based compound, are bonded to a polymer chain, and thus, affinity with a filler, particularly, a silica-based filler may be excellent, and toxic components possibly generated during manufacturing processed goods (for example, tires) due to an amine group included in a polymer itself may be decreased.

In addition, according to the preparation method of the present invention, a modified and conjugated diene-based polymer having a good modification ratio may be easily prepared by using a polymer compound containing a constituent unit represented by Formula 1. In addition, according to the preparation method, a polymer compound containing a constituent unit represented by Formula 1 and an active polymer are reacted, and are continuously reacted with a silane-based compound. Thus, affinity with a silica-based filler may be markedly improved and processability may be increased when compared to a common modified conjugated diene-based polymer.

Also, since the rubber composition according to the present invention includes the modified and conjugated diene-based polymer having excellent affinity with the filler, the processability thereof may be excellent, and as a result, processed goods manufactured using the rubber composition may have excellent tensile strength, abrasion resistance, and wet traction.

BEST MODE FOR CARRYING OUT THE INVENTION

Hereinafter, the present invention will now be described in more detail in order to assist the understanding of the present invention.

It will be understood that words or terms used in the specification and claims shall not be interpreted as the meaning defined in commonly used dictionaries. It will be further understood that the words or terms should be interpreted as having a meaning that is consistent with their meaning of the technical idea of the invention, based on the principle that an inventor may properly define the meaning of the words or terms to best explain the invention.

The present invention provides a polymer compound for modifying rubber, which may provide a plurality of functional groups.

The polymer compound according to an embodiment of the present invention is characterized in including a constituent unit represented by Formula 1 below.

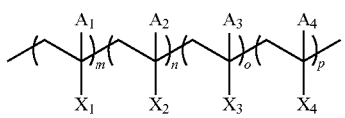
[Formula 1]

In Formula 1, $X_1$, $X_2$, $X_3$ and $X_4$ are each independently a derived substituent from a compound containing $C_{1-10}$alkyl, amine, ester, nitrile, benzophenone, acryl, vinyl, styrene, styrenacryl, or aryl, which is unsubstituted or substituted with at least one substituent selected from the group consisting of halogen, $C_{1-20}$alkyl, $C_{3-20}$cycloalkyl, and $C_{6-30}$aryl, m, n, o and p represent a molar ratio of each repeating unit, where m+n+o+p is 100, m is 1 to 50, n is 0 to 50, o is 1 to 50, p is 1 to 70, and $A_1$ to $A_4$ are each independently a hydrogen atom, or $C_{1-3}$alkyl.

The polymer compound may be a derived unit containing a plurality of functional groups in a main chain as shown in Formula 1, for example, may be a compound containing a constituent unit in which $X_1$, $X_2$, $X_3$ and $X_4$ are combined. Since the polymer compound includes a derived unit containing a plurality of functional groups, functional groups may be provided on purposes when using thereof as a polymer modifier.

In this case, the polymer compound may be a block copolymer in which each repeating unit having molar ratios of m, n, o and p forms each block, or may be a random copolymer in which each repeating unit is arranged in disorder.

The terms "derived substituent" and "derived unit" used in the present invention may denote a structure, a material, or a derived functional group come from a certain material, or may denote the material itself. For example, a derived substituent from a compound containing nitrile may represent a structure or a functional group originated from the compound containing nitrile, or the compound containing nitrile itself.

Particularly, $X_1$, $X_2$, $X_3$ and $X_4$ in Formula 1 are each independently a derived substituent from a compound containing $C_{1-10}$alkyl, amine, ester, nitrile, benzophenone, acryl, vinyl, styrene, styrenacryl, or aryl, which is unsubstituted or substituted with at least one substituent selected from the group consisting of halogen, $C_{1-20}$alkyl, $C_{3-20}$cycloalkyl and $C_{6-30}$aryl. Particularly, at least one of $X_1$, $X_2$, $X_3$ and $X_4$ may be substituted with halogen.

Particularly, according to an embodiment of the present invention, in Formula 1, $X_1$ may be $C_{1-10}$alkyl, ester or alkylaryl substituted with halogen.

In addition, in Formula 1, $X_2$ may be $C_{6-10}$aryl unsubstituted or substituted with $C_{1-3}$alkyl or $C_{3-10}$cycloalkyl.

In addition, in Formula 1, $X_3$ may be represented by Formula 2 below.

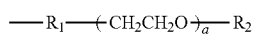
[Formula 2]

In Formula 2, $R_1$ is ester, $R_2$ is $C_{1-20}$alkyl, and a is an integer of 0 to 10.

Particularly, in Formula 2, $R_1$ may be ester, $R_2$ may be $C_{1-20}$alkyl, and a may be an integer of 0 to 3. More particularly, in Formula 2, in a case where a is 0, $R_1$ may be ester, and $R_2$ may be $C_{6-20}$alkyl, and in a case where a is not 0, $R_1$ may be ester, and $R_2$ may be $C_{1-6}$alkyl. Here, $R_1$ may be a part which is bonded to the main chain of the polymer compound.

In addition, in Formula 1, $X_1$ may be represented by Formula 3 below.

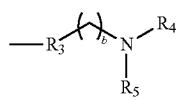
[Formula 3]

In Formula 3, $R_3$ is $C_{1-6}$alkylene, ester, or $C_{6-10}$arylene, $R_4$ and $R_5$ are each independently $C_{1-10}$alkyl, or are combined with each other to form a $C_{3-10}$ ring structure, and b is an integer of 1 to 8.

Particularly, in Formula 3, $R_3$ may be $C_{6-10}$arylene, and $R_4$ and $R_5$ may be each independently $C_{1-6}$alkyl. Here, $R_3$ may be a part which is bonded to the main chain of the polymer compound.

More particularly, a polymer compound containing a constituent unit represented by Formula 1 may include a constituent unit represented by Formula 4 or Formula 5.

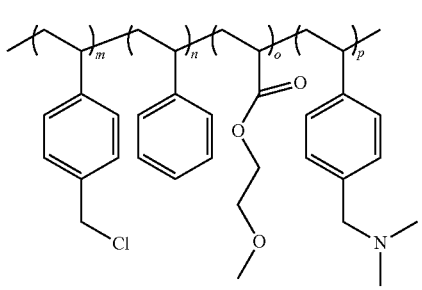
[Formula 4]

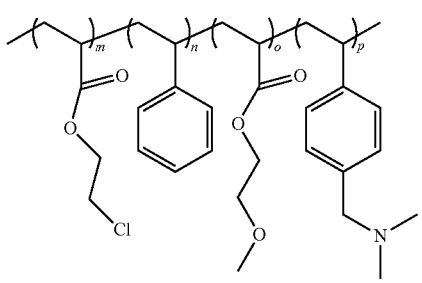
[Formula 5]

In Formula 4 and Formula 5, m, n, o and p represent a molar ratio of each repeating unit, where m+n+o+p is 100, m is 1 to 50, n is 0 to 50, o is 1 to 50, and p is 1 to 70.

In addition, the polymer compound containing the constituent unit represented by Formula 1 may be a rubber modifier.

In particular, the polymer compound containing the constituent unit represented by Formula 1 may be a modifier for a conjugated diene-based polymer. Here, the conjugated diene-based polymer may be a conjugated diene-based homopolymer, or a copolymer of a conjugated diene-based monomer and an aromatic vinyl-based monomer.

In addition, there is provided in the present invention a modified and conjugated diene-based polymer prepared by the preparation method.

The modified and conjugated diene-based polymer according to an embodiment of the present invention is characterized in including a functional group derived from a polymer compound containing a constituent unit represented by Formula 1 below.

[Formula 1]

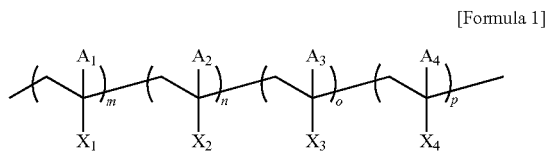

In Formula 1, $X_1$, $X_2$, $X_3$ and $X_4$ are each independently a derived substituent from a compound containing $C_{1-10}$alkyl, amine, ester, nitrile, benzophenone, acryl, vinyl, styrene, styrenacryl, or aryl, which is unsubstituted or substituted with at least one substituent selected from the group consisting of halogen, $C_{1-20}$alkyl, $C_{3-20}$cycloalkyl, and $C_{6-30}$aryl, m, n, o and p represent a molar ratio of each repeating unit, where m+n+o+p is 100, m is 1 to 50, n is 0 to 50, o is 1 to 50, p is 1 to 70, and $A_1$ to $A_4$ are each independently a hydrogen atom, or $C_{1-3}$alkyl.

Particularly, the polymer compound including the constituent unit represented by Formula 1 is the same as described above.

The modified and conjugated diene-based polymer according to an embodiment of the present invention may be prepared via a preparation method which will be explained hereinafter, and may include a functional group derived from a polymer compound containing a constituent unit represented by Formula 1. In addition, the modified and conjugated diene-based polymer according to an embodiment of the present invention may include a derived functional group from a silane-based compound.

The modified and conjugated diene-based polymer according to an embodiment of the present invention may be represented by Formula 6 or Formula 7.

[Formula 6]

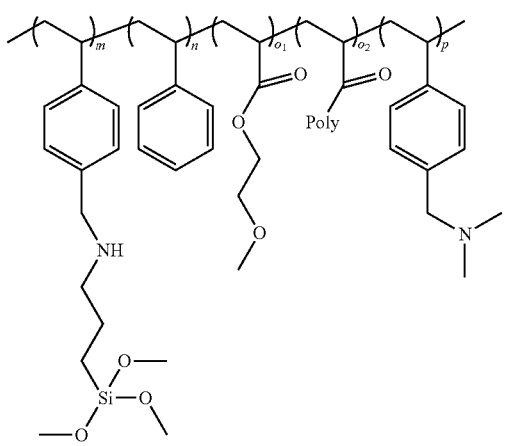

[Formula 7]

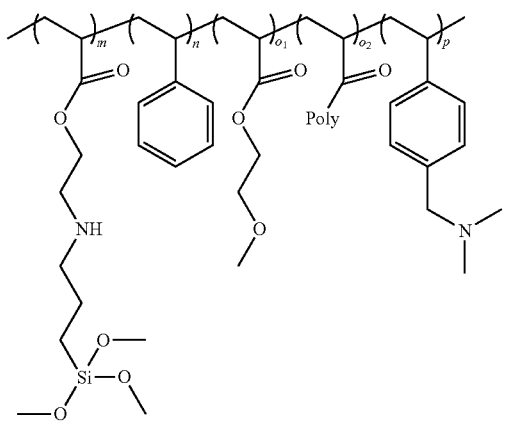

In Formula 6 and Formula 7,

Poly represents a polymer chain, m, n, $o_1$, $o_2$ and p represent a molar ratio of each repeating unit, where m+n+$o_1$+$o_2$+p is 100, m, n, and p are the same as described above, and $o_1$+$o_2$ is 1 to 50, $o_1$ is 0 to 49, and $o_2$ is 1 to 50.

In the modified and conjugated diene-based polymer according to an embodiment of the present invention, a functional group derived from a polymer compound containing a configuration unit represented by Formula 1 and a functional group derived from a silane-based compound are bonded, and affinity with a filler, specifically with a silica-based filler may be excellent. Particularly, since the functional group derived from the silane-based compound is not directly bonded to a polymer chain, affinity with a silica-based filler may be markedly improved when compared to a common modified and conjugated diene-based polymer. Accordingly, a rubber composition including the modified and conjugated diene-based polymer may have excellent processability, and as a result, molded articles manufactured using the rubber composition, for example, tires may have improved tensile strength, abrasion resistance and wet traction. In addition, an amine group may be bonded in the modified and conjugated diene-based polymer, and thus, the generation of toxic components may be decreased during manufacturing molded articles, for example, tires by using a rubber composition using the modified and conjugated diene-based polymer when compared to a case where separately injecting an amine component.

In particular, the modified and conjugated diene-based polymer may include from 100 ppm to 10,000 ppm of a silane group based on the total amount of the polymer. Here, the amount of the silane group is a value obtained by analyzing silicon (Si) in the polymer via an inductively coupled plasma (ICP) analysis.

In addition, the number average molecular weight of the modified and conjugated diene-based polymer may be from 10,000 g/mol to 1,000,000 g/mol, and particularly, from 100,000 g/mol to 700,000 g/mol.

The weight average molecular weight of the modified and conjugated diene-based polymer may be from 100,000 g/mol to 2,000,000 g/mol, and particularly, from 200,000 g/mol to 1,500,000 g/mol. The modified and conjugated diene-based polymer may have a molecular weight distribution of 1.0 to 3.0, and particularly, 1.5 to 2.5.

Here, the weight average molecular weight and the number average molecular weight are molecular weights analyzed by gel permeation chromatography (GPC) with a polystyrene standard, respectively, and molecular weight distribution (Mw/Mn) is referred to as polydispersity, which is calculated as a ratio (Mw/Mn) of the weight average molecular weight (Mw) and the number average molecular weight (Mn).

In addition, the modified and conjugated diene-based polymer may have a vinyl content of 5 wt % or more, particularly, 10 wt % or more, and more particularly, from 10 wt % to 50 wt %. When the vinyl content is in the range, a glass transition temperature may be controlled in an appropriate range. Accordingly, when applied to tires, physical properties required for tires such as running resistance and braking force may be excellent, and fuel consumption reducing effect may be attained.

In this case, the vinyl content represents the amount of not 1,4-added but 1,2-added conjugated diene-based monomer based on 100 wt % of a conjugated diene-based polymer composed of a vinyl group-containing monomer or a conjugated diene-based monomer.

In addition, the modified and conjugated diene-based polymer may be prepared by a preparation method which will be explained hereinafter, and may be a conjugated diene-based monomer homopolymer or a copolymer of a vinyl-based aromatic monomer and a conjugated diene-based monomer. When the polymer is the copolymer, the derived substituent from the aromatic vinyl-based monomer may be included in an amount of 50 wt % or less.

In addition, there is provided in the present invention a method for preparing a modified and conjugated diene-based polymer using a polymer compound.

The preparation method according to an embodiment of the present invention is characterized in including 1) polymerizing conjugated diene-based monomers, or an aromatic vinyl-based monomer and a conjugated diene-based monomer in the presence of an organo-alkali metal compound in a hydrocarbon solvent to prepare an active polymer in which an alkali metal is bonded to at least one terminal thereof (step 1); 2) reacting the active polymer with a polymer compound containing a constituent unit represented by the following Formula 1 to obtain a first modified polymer (step 2); and 3) reacting the first modified polymer with a silane-based compound (step 3):

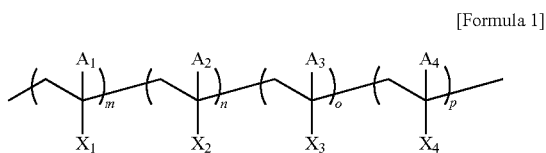

[Formula 1]

in Formula 1, $X_1$, $X_2$, $X_3$ and $X_4$ are each independently a derived substituent from a compound containing $C_{1-10}$alkyl, amine, ester, nitrile, benzophenone, acryl, vinyl, styrene, styrenacryl, or aryl, which is unsubstituted or substituted with at least one substituent selected from the group consisting of halogen, $C_{1-20}$alkyl, $C_{3-20}$cycloalkyl, and $C_{6-30}$aryl, m, n, o and p represent a molar ratio of each repeating unit, where m+n+o+p is 100, m is 1 to 50, n is 0 to 50, o is 1 to 50, p is 1 to 70, and $A_1$ to $A_4$ are each independently a hydrogen atom, or $C_{1-3}$alkyl.

Particularly, the polymer compound containing the constituent unit represented by Formula 1 is the same as described above.

Since the method for preparing a modified and conjugated diene-based polymer according to an embodiment of the present invention includes a step of reacting a polymer compound containing a constituent unit represented by Formula 1 with an active polymer, and continuously reacting with a silane-based compound, a silane group not bonded to a conjugated diene-based polymer, for example, a styrene-butadiene copolymer chain may be included in a modified and conjugated diene-based polymer, and affinity with silica may be even more improved when compared to a common modified and conjugated diene-based polymer.

When examining concretely, step 1 is a step for preparing an active polymer in which an alkali metal is bonded to at least one terminal and may be conducted by polymerizing conjugated diene-based monomers, or an aromatic vinyl-based monomer and a conjugated diene-based monomer in the presence of an organo-alkali metal compound in a hydrocarbon solvent.

The polymerization of step 1 may use a conjugated diene-based monomer, or both an aromatic vinyl-based monomer and a conjugated diene-based monomer as monomers. That is, a polymer prepared via the preparation method according to an embodiment of the present invention may be a polymer derived from a conjugated diene-based monomer or a copolymer derived from an aromatic vinyl-based monomer and a conjugated diene-based monomer.

In this case, the copolymer may be a random copolymer.

Here, the "random copolymer" may denote a copolymer in which the constituent units thereof are arranged in disorder.

The conjugated diene-based monomer may be, for example, at least one selected from the group consisting of 1,3-butadiene, 2,3-dimethyl-1,3-butadiene, piperylene, 3-butyl-1,3-octadiene, isoprene, and 2-phenyl-1,3-butadiene, without specific limitation.

The aromatic vinyl-based monomer may be, for example, at least one selected from the group consisting of styrene, α-methylstyrene, 3-methylstyrene, 4-methylstyrene, 4-propylstyrene, 1-vinylnaphthalene, 4-cyclohexylstyrene, 4-(p-methylphenyl)styrene, and 1-vinyl-5-hexylnaphthalene, without specific limitation.

In the case where the modified and conjugated diene-based polymer is a copolymer derived from a conjugated diene-based monomer and an aromatic vinyl-based monomer, the conjugated diene-based monomer may be used in an amount such that an amount of the derived unit of the conjugated diene-based monomer in a finally prepared modified and conjugated diene-based polymer is 60 wt % or more, particularly, from 60 wt % to 90 wt %, and more particularly, from 60 wt % to 85 wt %.

The hydrocarbon solvent is not specifically limited and may be, for example, at least one selected from the group consisting of n-pentane, n-hexane, n-heptane, isooctane, cyclohexane, toluene, benzene and xylene.

The organo-alkali metal compound may be used from 0.01 mmol to 10 mmol based on 100 g of the total monomers.

The organo-alkali metal compound may be, for example, at least one selected from the group consisting of methyllithium, ethyllithium, propyllithium, n-butyllithium, s-butyllithium, t-butyllithium, hexyllithium, n-decyllithium, t-octyllithium, phenyllithium, 1-naphthyl lithium, n-eicosyl lithium, 4-butylphenyl lithium, 4-tolyl lithium, cyclohexyl lithium, 3,5-di-n-heptylcyclohexyl lithium, 4-cyclopentyl lithium, naphthyl sodium, naphthyl potassium, lithium alkoxide, sodium alkoxide, potassium alkoxide, lithium sulfonate, sodium sulfonate, potassium sulfonate, lithium amide, sodium amide, potassium amide, and lithium isopropylamide, without specific limitation.

The polymerization of step 1 may be conducted by further adding a polar additive as needed, and the polar additive may be added in an amount of 0.001 parts by weight to 10 parts by weight based on 100 parts by weight of the total monomers. Particularly, the addition amount may be from 0.001 parts by weight to 1 part by weight, more particularly, from 0.005 parts by weight to 0.1 parts by weight based on 100 parts by weight of the total monomers.

The polar additive may be at least one selected from the group consisting of tetrahydrofuran, ditetrahydrofurylpropane, diethyl ether, cycloamyl ether, dipropyl ether, ethylene dimethyl ether, ethylene dimethyl ether, diethyl glycol, dimethyl ether, tertiary butoxyethoxyethane, bis(3-dimethylaminoethyl)ether, (dimethylaminoethyl) ethyl ether, trimethylamine, triethylamine, tripropylamine, and tetramethylethylenediamine.

In the preparation method according to an embodiment of the present invention, when a conjugated diene-based monomer and an aromatic vinyl-based monomer are copolymerized, the difference of the reaction rates between them may be compensated by the addition of the polar additive, and the easy formation of a random copolymer may be attained.

The polymerization of step 1 may be conducted by an adiabatic polymerization, or a polymerization at a constant temperature.

Here, the adiabatic polymerization means a polymerization method including a step of polymerization using self-generated heat of reaction without optionally applying heat after adding an organo-alkali metal compound. The polymerization at a constant temperature means a polymerization method by which the temperature of a polymer is kept constant by optionally applying heat or taking heat after adding an organo-alkali metal compound.

The polymerization may be conducted in a temperature range of −20° C. to 200° C., particularly, 0° C. to 150° C., and more particularly, 10° C. to 120° C.

Step 2 is a step of reacting the active polymer and a polymer compound containing a constituent unit represented by Formula 1 to prepare a first modified polymer. In this case, in the first modified polymer, a functional group derived from a polymer compound containing a constituent unit represented by Formula 1 is bonded to one terminal of a chain of a conjugated diene-based polymer.

The polymer compound containing a constituent unit represented by Formula 1 may be used in a ratio of 0.1 mol to 10 mol based on 1 mol of the organo-alkali metal compound.

The reaction of step 2 according to an embodiment of the present invention is modification reaction for introducing a functional group into a polymer, and the reaction may be conducted in a temperature range of 10° C. to 120° C. for 10 minute to 5 hours.

The preparation method according to an embodiment of the present invention may further include at least one step of recovering and drying of solvents and unreacted monomers after step 2 if needed.

Meanwhile, by reacting the first modified polymer obtained in step 2 with a silane-based compound in the reaction of step 3 according to an embodiment of the present invention, affinity with a silica compound may be maximized.

Particularly, in the reaction of step 3, since the silane-based compound is combined not with a conjugated diene-based polymer chain in the first modification polymer but combined with a halogen atom in the polymer, and a silane group not bonded to a polymer chain may be included in the polymer, affinity with silica may be improved when compared to a common modified and conjugated diene-based polymer.

The reaction in step 3 may be conducted in a temperature range of 10° C. to 120° C. for 10 minutes to 5 hours. The preparation method of a modified and conjugated diene-based polymer of the present invention may be a continuous polymerization method including, for example, one or at least two reactors.

The silane-based compound may be any one selected from the group consisting of vinyl chlorosilane, vinyltrimethoxysilane, vinyltriethoxysilane, 2-(3,4-epoxycyclohexyl)ethyltrimethoxysilane, 3-glycidoxypropyltrimethoxysilane, 3-glycidoxypropylmethyldiethoxysilane, 3-glycidoxypropyldiethoxysilane, 3-glycidoxypropyltriethoxysilane, p-styryltrimethoxysilane, 3-methacryloxypropyltriethoxysilane, 3-methacryloxypropyltrimethoxysilane, 3-methacryloxypropylmethyldimethoxysilane, 3-methacryloxypropylmethyldiethoxysilane, 3-acryloxypropyltrimethoxysilane, N-2-(aminoethyl)-3-aminopropylmethyldimethoxysilane, N-2-(aminoethyl)-3-aminopropyltrimethoxysilane, N-2-(aminoethyl)-3-aminopropylmethyltriethoxysilane, 3-aminopropyltrimethoxysilane, 3-aminopropyltriethoxysilane, 3-triethoxysilyl-N-(1,3-dimethylbutylidene)propylamine, N-phenyl-3-aminopropyltrimethoxysilane, 3-chloropropyltrimethoxysilane, 3-mercaptopropylmethyldimethoxysilane, 3-mercaptopropyltrimethoxysilane, bis(triethoxysilylpropyl)tetrasulfide, and 3-isocyanatopropyltriethoxysilane, or a mixture of at least two thereof.

In addition, the silane-based compound may be used in a molar ratio of 0.001 mol to 10 mol based on 1 mol of the polymer compound, particularly, 0.001 mol to 5 mol, and more particularly, 0.005 mol to 1 mol based on 1 mol of the polymer compound.

Meanwhile, the preparation method of a modified and conjugated diene-based polymer according to an embodiment of the present invention may be conducted via a step represented in Reaction 1 below.

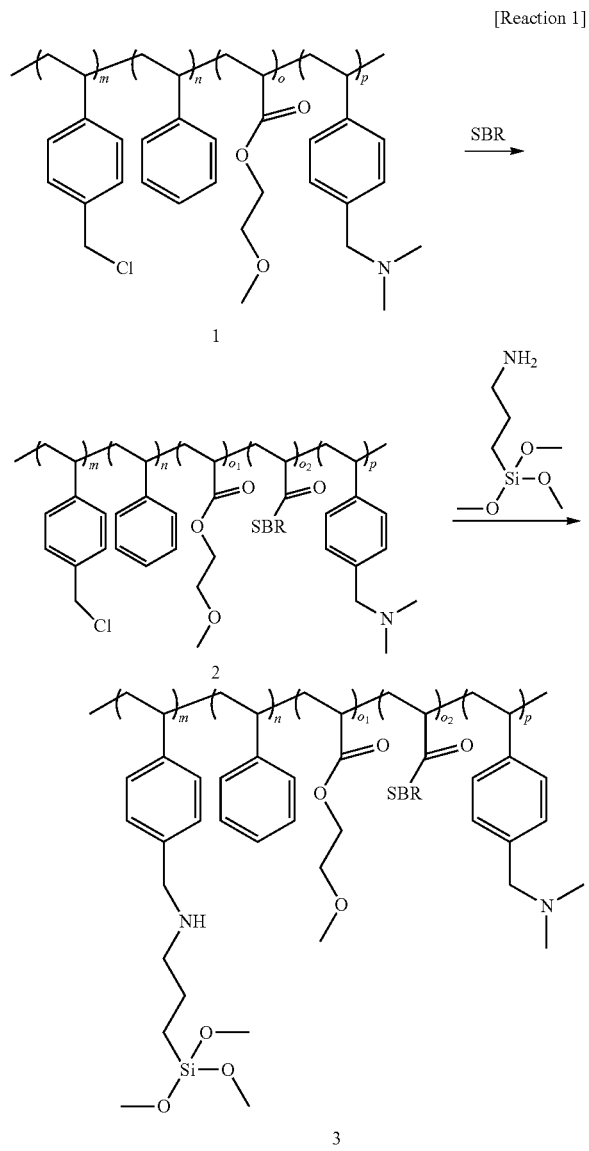

In Reaction 1, SBR represents a styrene-butadiene copolymer chain, and m, n, o, $o_1$, $o_2$ and p are the same as described above.

As shown in Reaction 1, in the preparation method according to an embodiment of the present invention, a styrene-butadiene copolymer is prepared and is reacted with a polymer compound containing a constituent unit represented by Formula 1 (1 in Reaction 1) to prepare a compound containing a constituent unit represented by 2 (2 in Reaction 1), and a silane-based compound (for example, 3-aminopropyltrimethoxysilane) is reacted therewith to prepare a modified and conjugated diene-based polymer represented by 3 (3 in Reaction 1).

Further, there is provided in the present invention a rubber composition including the modified and conjugated diene-based polymer.

The rubber composition according to an embodiment of the present invention may include the modified and conjugated diene-based polymer in an amount of 10 wt % or more, particularly 10 wt % to 100 wt %, and more particularly 20 wt % to 90 wt %. If the amount of the modified and conjugated diene-based polymer is less than 10 wt %, an effect of improving abrasion resistance and crack resistance of molded articles, for example, tires manufactured by using the rubber composition may be insignificant.

In addition, the rubber composition may further include other rubber components, if necessary, in addition to the modified and conjugated diene-based polymer, and, in this case, the rubber component may be included in an amount of 90 wt % or less based on the total amount of the rubber composition. Specifically, the rubber composition may include the rubber component in an amount of 1 part by weight to 90 parts by weight based on 100 parts by weight of the modified and conjugated diene-based polymer.

The rubber component may be a natural rubber or a synthetic rubber, and the rubber component may be, for example, a natural rubber (NR) including cis-1,4-polyisoprene; a modified natural rubber which is obtained by modifying or purifying a common natural rubber, such as an epoxidized natural rubber (ENR), a deproteinized natural rubber (DPNR), and a hydrogenated natural rubber; and a synthetic rubber such as a styrene-butadiene copolymer (SBR), a polybutadiene (BR), a polyisoprene (IR), a butyl rubber (IIR), an ethylene-propylene copolymer, a polyisobutylene-co-isoprene, a neoprene, a polyethylene-co-propylene), a poly(styrene-co-butadiene), a poly(styrene-co-isoprene), a poly(styrene-co-isoprene-co-butadiene), a poly(isoprene-co-butadiene), a poly(ethylene-co-propylene-co-diene), a polysulfide rubber, an acryl rubber, a urethane rubber, a silicone rubber, an epichlorohydrin rubber, a butyl rubber, a halogenated butyl rubber, and any one or a mixture of at least two thereof may be used.

In addition, the rubber composition may include 0.1 parts by weight to 200 parts by weight of a filler based on 100 parts by weight of the modified and conjugated diene-based polymer, and the filler may be a silica-based filler, a carbon black-based filler, or a combination thereof.

Meanwhile, in the case where a silica-based filler is used as the filler, a silane coupling agent may be used together for the improvement of reinforcing and low exothermic properties.

The silane coupling agent may particularly include bis(3-triethoxysilylpropyl)tetrasulfide, bis(3-triethoxysilylpropyl)trisulfide, bis(3-triethoxysilylpropyl)disulfide, bis(2-triethoxysilylethyl)tetrasulfide, bis(3-trimethoxysilylpropyl)tetrasulfide, bis(2-trimethoxysilylethyl)tetrasulfide, 3-mercaptopropyltrimethoxysilane, 3-mercaptopropyltriethoxysilane, 2-mercaptoethyltrimethoxysilane, 2-mercaptoethyltriethoxysilane, 3-trimethoxysilylpropyl-N,N-dimethylthiocarbamoyltetrasulfide, 3-triethoxysilylpropyl-N,N-dimethylthiocarbamoyltetrasulfide, 2-triethoxysilylethyl-N,N-dimethylthiocarbamoyltetrasulfide, 3-trimethoxysilylpropylbenzothiazolyltetrasulfide, 3-triethoxysilylpropylbenzolyltetrasulfide, 3-triethoxysilylpropylmethacrylatemonosulfide, 3-trimethoxysilylpropylmethacrylatemonosulfide, bis(3-diethoxymethylsilylpropyl)tetrasulfide, 3-mercaptopropyldimethoxymethylsilane, dimethoxymethylsilylpropyl-N,N-dimethylthiocarbamoyltetrasulfide, or dimethoxymethylsilylpropylbenzothiazolyltetrasulfide, and any one or a mixture of at least two thereof may be used. More particularly, the silane coupling agent may be bis(3-triethoxysilylpropyl)polysulfide or 3-trimethoxysilylpropylbenzothiazyltetrasulfide in consideration of the improving effect of reinforcing properties.

In addition, in the rubber composition according to an embodiment of the present invention, a modified and conjugated diene-based polymer in which a functional group having high affinity with a silica-based filler is introduced at an active part as a rubber component is used, and the compounding amount of a silane coupling agent may be smaller than a common case. In particular, the silane coupling agent may be used in an amount of 1 part by weight to 20 parts by weight based on 100 parts by weight of the silica-based filler. When used in the above range, effects as a coupling agent may be sufficiently exhibited, and the gelation of a rubber component may be prevented. More particularly, the silane coupling agent may be used in an amount of 5 parts by weight to 15 parts by weight based on 100 parts by weight of silica.

In addition, the rubber composition according to an embodiment of the present invention may be sulfur crosslinkable, and so may further include a vulcanizing agent.

The vulcanizing agent may be particularly a sulfur powder and may be included in an amount of 0.1 parts by weight to 10 parts by weight based on 100 parts by weight of a rubber component. With the amount in the above range, elasticity and strength required for a vulcanized rubber composition may be secured, and at the same time, a low fuel consumption ratio may be attained.

In addition, the rubber composition according to an embodiment of the present invention may further include various additives used in a common rubber industry in addition to the above components, particularly, a vulcanization accelerator, a process oil, a plasticizer, an antiaging agent, a scorch preventing agent, a zinc white, stearic acid, a thermosetting resin, or a thermoplastic resin.

The vulcanization accelerator is not specifically limited and may particularly include thiazole-based compounds such as 2-mercaptobenzothiazole (M), dibenzothiazyldisulfide (DM), and N-cyclohexyl-2-benzothiazylsulfenamide (CZ), or guanidine-based compounds such as diphenylguanidine (DPG). The vulcanization accelerator may be included in an amount of 0.1 parts by weight to 5 parts by weight based on 100 parts by weight of the rubber component.

In addition, the process oil acts as a softener in a rubber composition and may particularly include a paraffin-based, naphthene-based, or aromatic compound. More particularly, an aromatic process oil may be used in consideration of tensile strength and abrasion resistance, and a naphthene-based or paraffin-based process oil may be used in consideration of hysteresis loss and low temperature properties. The process oil may be included in an amount of 100 parts by weight or less based on 100 parts by weight of the rubber component. With the above-described amount, the deterioration of tensile strength and low exothermic properties (low fuel consumption ratio) of the vulcanized rubber may be prevented.

In addition, the antiaging agent may particularly include N-isopropyl-N'-phenyl-p-phenylenediamine, N-(1,3-dimethylbutyl)-N'-phenyl-p-phenylenediamine, 6-ethoxy-2,2,4-trimethyl-1,2-dihydroquinoline, or a condensate of diphenylamine and acetone at a high temperature. The antiaging agent may be used in an amount of 0.1 parts by weight to 6 parts by weight based on 100 parts by weight of the rubber component.

The rubber composition according to an embodiment of the present invention may be obtained by mulling using a mulling apparatus such as a banbury mixer, a roll, and an internal mixer according to a mixing prescription. In addition, a rubber composition having low exothermic properties and good abrasion resistance may be obtained due to a vulcanization process after a molding process.

Therefore, the rubber composition may be useful to the manufacture of each member of a tire such as a tire tread, an under tread, a side wall, a carcass coating rubber, a belt coating rubber, a bead filler, a chafer, and a bead coating rubber, or to the manufacture of rubber products in various industries such as a dustproof rubber, a belt conveyor, and a hose.

Also, there is provided in the present invention a tire manufactured using the rubber composition.

The tire may include a tire or a tire tread.

Hereinafter, the present invention will be explained in particular referring to non-limiting embodiments. However, the following embodiments and experimental embodiments are only for the illustration of the present invention, and the scope of the present invention is not limited thereto.

Preparation Example 1

To a 5 L reactor equipped with a jacket for controlling temperature, a solvent condensing apparatus and an agitating apparatus, 60.1 g (0.39 mol) of 4-(chloromethyl)styrene (CMSt), 164.1 g (1.58 mol) of styrene (SM), 174.2 g (1.34 mol) of 2-methoxyethylacrylate (MEA), 101.6 g (0.63 mol) of N,N-dimethylaminomethylstyrene (DMAMS), and 2 kg of tetrahydrofuran (THF) were injected, followed by elevating the temperature to 65° C. and stirring for 5 minutes. Then, in a 500 ml beaker, 33.6 g (0.2 mol) of 2,2'-azobisisobutyronitrile (AIBN) was dissolved in 168.0 g of tetrahydrofuran, and the resultant solution was injected to the reactor, followed by stirring at 65° C. for 12 hours for performing the reaction to prepare Modifier A which is a polymer compound including a constituent unit represented by the following Formula (i):

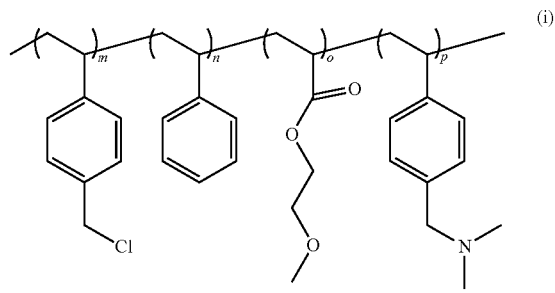

in Formula (i), m is 10, n is 40, o is 34, and p is 16.

Preparation Example 2

To a 5 L reactor equipped with a jacket for controlling temperature, a solvent condensing apparatus and an agitating apparatus, 88.0 g (0.58 mol) of 4-(chloromethyl)styrene (CMSt), 140.2 g (1.35 mol) of styrene (SM), 160.2 g (1.23 mol) of 2-methoxyethylacrylate (MEA), 111.6 g (0.69 mol) of N,N-dimethylaminomethylstyrene (DMAMS), and 2 kg of tetrahydrofuran (THF) were injected, followed by elevating the temperature to 65° C. and stirring for 5 minutes. Then, in a 500 ml beaker, 35.1 g (0.21 mol) of azobisisobutyronitrile (AIBN) was dissolved in 168.0 g of tetrahydrofuran, and the resultant solution was injected to the reactor, followed by stirring at 65° C. for 12 hours for performing the reaction to prepare Modifier B which is a polymer compound including a constituent unit represented by Formula (i), where m is 15, n is 35, o is 32, and p is 18.

Preparation Example 3

To a 5 L reactor equipped with a jacket for controlling temperature, a solvent condensing apparatus and an agitating apparatus, 46.5 g (0.30 mol) of 4-(chloromethyl)styrene (CMSt), 135.0 g (1.30 mol) of styrene (SM), 158.7 g (1.22 mol) of 2-methoxyethylacrylate (MEA), 159.8 g (0.99 mol) of N,N-dimethylaminomethylstyrene (DMAMS), and 2 kg of tetrahydrofuran (THF) were injected, followed by elevating the temperature to 65° C. and stirring for 5 minutes. Then, in a 500 ml beaker, 34.8 g (0.21 mol) of azobisisobutyronitrile (AIBN) was dissolved in 168.0 g of tetrahydrofuran, and the resultant solution was injected to the reactor, followed by stirring at 65° C. for 12 hours for performing the reaction to prepare Modifier C which is a polymer compound including a constituent unit represented by Formula (i), where m is 8, n is 34, o is 32, and p is 26.

Preparation Example 4

To a 5 L reactor equipped with a jacket for controlling temperature, a solvent condensing apparatus and an agitating apparatus, 34.9 g (0.23 mol) of 2-(chloroethyl)acrylate (CEA), 134.8 g (1.29 mol) of styrene (SM), 158.5 g (1.22 mol) of 2-methoxyethylacrylate (MEA), 171.8 g (1.07 mol) of N,N-dimethylaminomethylstyrene (DMAMS), and 2 kg of tetrahydrofuran (THF) were injected, followed by elevating the temperature to 65° C. and stirring for 5 minutes. Then, in a 500 ml beaker, 32.6 g (0.2 mol) of azobisisobutyronitrile (AIBN) was dissolved in 168.0 g of tetrahydrofuran, and the resultant solution was injected to the reactor, followed by stirring at 65° C. for 12 hours for performing the reaction to prepare Modifier D which is a polymer compound including a constituent unit represented by the following Formula (ii):

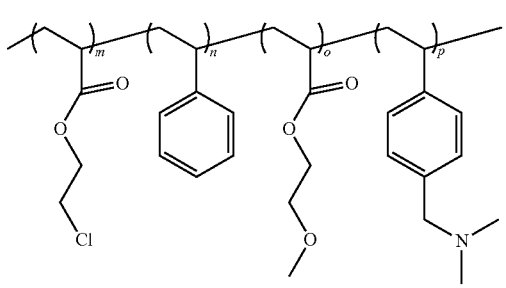

(ii)

in Formula (ii), m is 6, n is 34, o is 32, and p is 28.

The synthesis of Modifier A to Modifier D, which are polymer compounds prepared in Preparation Examples 1 to 4, respectively, was identified via molecular weight analysis, and the results are shown in Table 1 below.

In particular, the molecular weight analysis was conducted by GPC analysis under conditions of 40° C. In this case, two columns of PLgel Olexis and one column of PLgel mixed-C manufactured by Polymer Laboratories Co. Ltd. were used in combination as columns, and newly replaced columns were all mixed bed type columns. In addition, polystyrene (PS) was used as a GPC standard material for calculating the molecular weight.

TABLE 1

| Division | Monomer used | Composition (molar ratio) | Number average molecular weight (g/mol) | Molecular weight distribution |
|---|---|---|---|---|
| Modifier A | CMSt/SM/ MEA/DMAMS | 10/40/34/16 | 6600 | 1.8 |
| Modifier B | CMSt/SM/ MEA/DMAMS | 15/35/32/18 | 6400 | 2.2 |
| Modifier C | CMSt/SM/ MEA/DMAMS | 8/34/32/26 | 7000 | 2.1 |
| Modifier D | CEA/SM/ ODMA/DMAMS | 6/34/32/28 | 6300 | 1.9 |

Example 1

To a 10 L autoclave reactor, 250 g of styrene, 750 g of 1,3-butadiene, 7 kg of cyclohexane, and 0.8 g of ditetrahydrofurylpropane as a polar additive were added, and the internal temperature of the reactor was elevated to 70° C. When the internal temperature of the reactor reached 60° C., 0.5 g of an n-hexane solution with 1.53 wt % of n-butyllithium was injected into the reactor, and an adiabatic reaction with heating was performed. The adiabatic reaction with heating was ended, and after about 40 minutes, 20 g of a polymerization solution was separately taken, and added to 100 g of isopropyl alcohol to precipitate and use for identifying the properties of a polymer before modification. Then, 32.8 g of Modifier A prepared in Preparation Example 1 was dissolved in 200 g of tetrahydrofuran and injected into the reactor, followed by performing the reaction for 30 minutes. 20 g of the reaction product was separately taken and added to 100 g of isopropyl alcohol to precipitate and use for identifying the properties of a first modified polymer. After that, 5.88 g of 3-aminopropyltrimethoxysilane was diluted in 10 g of cyclohexane and injected, followed by additionally reacting at 80° C. for 1 hour. The reaction was quenched using isopropyl alcohol, and 45 ml of a solution of 0.3 wt % of butylated hydroxytoluene (BHT) as an antioxidant dissolved in hexane was added thereto. The polymer thus obtained was injected to hot water heated with steam, stirred to remove solvents, and roll dried to remove remaining solvents and water to prepare a modified styrene-butadiene copolymer.

Example 2

A modified styrene-butadiene copolymer was prepared by performing the same method described in Example 1 except for using 32.8 g of Modifier B prepared in Preparation Example 2 instead of Modifier A.

Example 3

A modified styrene-butadiene copolymer was prepared by performing the same method described in Example 1 except for using 32.8 g of Modifier C prepared in Preparation Example 3 instead of Modifier A.

Example 4

A modified styrene-butadiene copolymer was prepared by performing the same method described in Example 1 except for using 32.8 g of Modifier D prepared in Preparation Example 4 instead of Modifier A.

Comparative Example 1

To a 10 L autoclave reactor, 250 g of styrene, 750 g of 1,3-butadiene, 7 kg of cyclohexane, and 0.8 g of ditetrahydrofurylpropane as a polar additive were added, and the internal temperature of the reactor was elevated to 70° C. When the internal temperature of the reactor reached 60° C., 0.5 g of an n-hexane solution with 1.53 wt % of n-butyllithium was injected into the reactor, and an adiabatic reaction with heating was performed. The adiabatic reaction with heating was ended, and after about 40 minutes, 20 g of a polymerization solution was separately taken, and added to 100 g of isopropyl alcohol to precipitate and use for identifying the properties of a polymer before modification. Then, 32.8 g of Modifier A prepared in Preparation Example 1 was dissolved in 200 g of tetrahydrofuran and injected into the reactor, followed by performing the reaction for 30 minutes. The reaction was quenched using isopropyl alcohol, and 45 ml of a solution of 0.3 wt % of butylated hydroxytoluene (BHT) as an antioxidant dissolved in hexane was added thereto. The polymer thus obtained was injected to hot water heated with steam, stirred to remove solvents, and roll dried to remove remaining solvents and water to prepare a modified styrene-butadiene copolymer.

Comparative Example 2

A styrene-butadiene copolymer was prepared by performing the same method described in Comparative Example 1 except for using 2.8 g of an n-hexane solution with 10 wt % of tetrachlorosilane as a coupling agent instead of Modifier A.

Comparative Example 3

A modified styrene-butadiene copolymer was prepared by performing the same method described in Example 1 except for using 11.3 g of 10 wt % 3-(N,N-dimethylamino)propyl trimethoxysilane solution instead of Modifier A.

Experimental Example 1

With respect to each of the copolymers prepared in Examples 1 to 4 and Comparative Examples 1 to 3, the styrene derived unit content and the vinyl content in each copolymer, the weight average molecular weight (Mw), the number average molecular weight (Mn), the maximum peak molecular weight (Mp), the molecular weight distribution (MWD, Mw/Mn), the mooney viscosity (MV) and, the silicon (Si) content were measured. The results are listed in Table 2 below.

1) Analysis of Styrene Derived Unit Content and Vinyl Content

The styrene derived unit (SM) content and the vinyl content in each copolymer were measured by using NMR.

2) Analysis of Molecular Weight

The weight average molecular weight (Mw, g/mol), the number average molecular weight (Mn, g/mol), and the maximum peak molecular weight (Mp, g/mol) were measured by GPC analysis under conditions of 40° C. The molecular weight distribution (Mw/Mn) was calculated as the ratio of the weight average molecular weight and the number average molecular weight thus measured, and a coupling number (Mp1/Mp2) was obtained by respectively measuring the maximum peak molecular weight after modification (Mp1) and the maximum peak molecular weight before modification (Mp2) and dividing. In this case, two columns of PLgel Olexis and one column of PLgel mixed-C manufactured by Polymer Laboratories Co. Ltd. were used in combination as columns, and newly replaced columns were all mixed bed type columns. In addition, polystyrene (PS) was used as a GPC standard material when calculating molecular weights.

3) Analysis of Mooney Viscosity

The mooney viscosity (MV, (ML1+4 @100° C.) of each copolymer was measured by using MV2000E (Alpha Technologies Co., Ltd.) using Large Rotor at a rotor speed of 2±0.02 rpm. In this case, a specimen used was stood at room temperature (23±3° C.) for 30 minutes or more, and 27±3 g of the specimen was collected and put in a die cavity, and then, Platen was operated, and pre-heated at 100° C. for 1 minute, and the mooney viscosity was measured for 4 minutes.

4) Analysis of Silicon (Si) Content

The silicon content of each copolymer was measured by using ICP-OES Optima8 300 DV (Perkin Elmer Co., Ltd.).

TABLE 2

| Division | Styrene (wt %) | Vinyl (wt %) | GPC | | | | Mooney viscosity (MV) | Si (ppm) |
| --- | --- | --- | --- | --- | --- | --- | --- | --- |
| | | | Mw (g/mol, ×10$^4$) | Mn (g/mol, ×10$^4$) | Mw/Mn | Coupling number | | |
| Example 1 | 24 | 46 | 54 | 34 | 1.6 | 2.4 | 70 | 523 |
| Example 2 | 25 | 47 | 54 | 32 | 1.7 | 2.6 | 69 | 762 |
| Example 3 | 25 | 46 | 61 | 34 | 1.8 | 2.5 | 74 | 369 |
| Example 4 | 25 | 46 | 51 | 32 | 1.6 | 2.2 | 64 | 283 |
| Comparative Example 1 | 24 | 46 | 56 | 35 | 1.6 | 2.4 | 71 | <10 |
| Comparative Example 2 | 24 | 45 | 59 | 37 | 1.6 | 2.4 | 74 | 56 |
| Comparative Example 3 | 24 | 46 | 45 | 32 | 1.4 | 1.8 | 56 | 145 |

In Table 2, the coupling number represents that a polymer chain was coupled or modified by a modifier, and the greater the value is, the higher the ratio of the coupling or modification is.

As shown in Table 2, all coupling numbers of Examples 1 to 4 according to exemplary embodiments of the present invention were greater than 2, and from the results, the modification was secured.

Experimental Example 2

The physical properties of a rubber composition including each copolymer of Examples 1 to 4 and Comparative Examples 1 to 3 and molded products manufactured therefrom, were comparatively analyzed. The results are listed in Table 3 below.

1) Preparation of Rubber Composition

Each rubber composition was prepared via a first stage mulling, a second stage mulling and a third stage mulling. In this case, the amounts used of materials excluding a modified and conjugated diene-based copolymer were shown based on 100 parts by weight of the modified and conjugated diene-based copolymer. In the first stage mulling, 100 parts by weight of each copolymer, 70 parts by weight of silica, 11.02 parts by weight of bis(3-triethoxysilylpropyl)tetrasulfide as a silane coupling agent, 33.75 parts by weight of a process oil (TDAE), 2.0 parts by weight of an antiaging agent (TMDQ), 2.0 parts by weight of an antioxidant, 3.0 parts by weight of zinc oxide (ZnO), 2.0 parts by weight of stearic acid, and 1.0 part by weight of wax were mixed and mulled under conditions of 80 rpm by using a banbury mixer equipped with a temperature controlling apparatus. In this case, the temperature of the mulling apparatus was controlled, and a first compound mixture was obtained at a discharge temperature of 140° C. to 150° C. At the second stage mulling, the first compound mixture was cooled to room temperature, and 1.75 parts by weight of a rubber accelerator (CZ), 1.5 parts by weight of a sulfur powder, and 2.0 parts by weight of a vulcanization accelerator were added to the mulling apparatus and mixed at a temperature of 60° C. or less to obtain a second compound mixture. Then, the second compound mixture was molded at a third stage mulling, and vulcanized at 180° C. for t90+10 minutes using a vulcanization press to prepare each vulcanized rubber.

2) Mooney Viscosity

The mooney viscosity (MV, (ML1+4 @100° C.)) for each of the first compound mixture (first stage mulling) and the second compound mixture (second stage mulling) was measured by using MV2000E manufactured by Alpha Technologies Co., Ltd. using Large Rotor at a rotor speed of 2±0.02 rpm. In this case, a specimen used was stood at room temperature (23±3° C.) for 30 minutes or more, and 27±3 g of the specimen was collected and put in a die cavity, and then, Platen was operated, and pre-heated at 100° C. for 1 minute, and the mooney viscosity was measured for 4 minutes.

3) Analysis of Payne Effect (AG') Analysis

The Payne effect was measured using 7 g of each vulcanized rubber with strain sweep of 0.04% to 40% in a rate of 1 Hz at 60° C. by using RPA 2000 manufactured by ALPHA Technologies Co., Ltd, and was shown as the difference between a minimum value and a maximum value. In this case, if the Payne effect decreases, dispersibility of a filler such as silica is improved.

4) Tensile Properties

The tensile properties were measured by manufacturing each specimen (thickness of 25 mm, length of 80 mm) and measuring tensile strength when broken and tensile stress when elongated by 300% (300% modulus) of each specimen according to an ASTM 412 tensile test method. Particularly, a Universal Test machine 4204 tensile tester (Instron Co., Ltd.) was used, and measurement was performed at room temperature at a rate of 50 cm/min, to obtain a tensile strength value and a tensile stress value when elongated by 300%.

5) Viscoelasticity Properties

The viscoelasticity properties were measured by using a dynamic mechanical analyzer (TA Co., Ltd.). Tan δ was measured by changing deformation at each measurement temperature (0° C. to 60° C.) with a twist mode and a frequency of 10 Hz. If the Tan δ at a low temperature of 0° C. is high, braking force is good, and if the Tan δ at a high temperature of 60° C. is low, hysteresis loss is small, low rolling resistance (fuel consumption ratio) is good. Resultant values were shown as Index values with the measured value of a rubber composition including the copolymer of Comparative Example 3 as 100. The viscoelasticity was improved according to the increase of the Index value.

6) Abrasion Resistance

Abrasion resistance was measured by using a DIN abrasion measuring apparatus. Resultant values were compared as Index values with the measured value of a rubber composition including the copolymer of Comparative Example 3 as 100. The abrasion resistance was improved according to the increase of the Index value.

TABLE 3

| Division | | Example 1 | Example 2 | Example 3 | Example 4 | Comparative Example 1 | Comparative Example 2 | Comparative Example 3 |
|---|---|---|---|---|---|---|---|---|
| Mooney viscosity (MV) | First stage mulling | 71 | 68 | 64 | 62 | 69 | 66 | 62 |
| | Second stage mulling | 58 | 57 | 56 | 54 | 62 | 61 | 54 |
| Payne effect (ΔG') | | 0.44 | 0.43 | 0.42 | 0.45 | 0.56 | 0.58 | 0.46 |
| Tensile properties | 300% modulus (Index) | 104 | 108 | 104 | 102 | 98 | 97 | 100 |
| | Tensile strength (Index) | 103 | 103 | 101 | 101 | 97 | 96 | 100 |
| Viscoelasticity properties | Tan δ at 0° C. | 104 | 106 | 103 | 104 | 94 | 92 | 100 |
| | Tan δ at 60° C. | 108 | 110 | 106 | 105 | 93 | 82 | 100 |
| Abrasion resistance (Index) | | 103 | 104 | 99 | 101 | 100 | 97 | 100 |

From the results of Table 3, the rubber compositions including the modified styrene-butadiene copolymers of Example 1 to Example 4, which were prepared using the polymer compound according to the present invention as a modifier, showed the same or better 300% modulus and tensile strength, increased braking force (0° C. Tan δ) by 3% to 6% with respect to wet roads, and largely improved low rolling resistance (60° C. Tan δ) by 5% to 10%, when compared to those of the rubber composition including the modified styrene-butadiene copolymer of Comparative Example 3, which was prepared using the conventional common modifier.

Meanwhile, the rubber compositions including the modified styrene-butadiene copolymers of Example 1 to Example 4 according to exemplary embodiments of the present invention showed improved wet traction, fuel consumption ratio and mechanical properties when compared to those of the rubber compositions including the unmodified and conjugated diene-based polymers of Comparative Example 1 and Comparative Example 2.

In addition, the specimens prepared from the rubber compositions including the modified styrene-butadiene copolymers of Example 1 to Example 4 according to exemplary embodiments of the present invention showed largely decreased values in Payne effect when compared to the specimens prepared using the rubber compositions including the unmodified or modified styrene-butadiene copolymers of Comparative Example 1 to Comparative Example 3, and from the results, it can be found that the dispersibility of silica in the rubber compositions including the modified styrene-butadiene copolymers of Example 1 to Example 4 was better than that of silica in the rubber compositions of Comparative Example 1 to Comparative Example 3. From the results, it can be found that the modified styrene-butadiene copolymers of Example 1 to Example 4 according to exemplary embodiments had excellent affinity with silica, i.e., a filler.

The invention claimed is:

1. A polymer compound comprising a constituent unit represented by the following Formula 1:

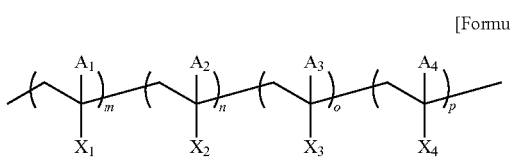

[Formula 1]

in Formula 1,
$X_1$ and $X_2$ are each independently a derived substituent from a compound containing $C_{1-10}$alkyl, amine, ester, nitrile, benzophenone, acryl, vinyl, styrene, styrenacryl, or aryl, which is unsubstituted or substituted with at least one substituent selected from the group consisting of halogen, $C_{1-20}$alkyl, $C_{3-20}$cycloalkyl, and $C_{6-30}$aryl, wherein the $C_{1-20}$alkyl, $C_{3-20}$cycloalkyl, and $C_{6-30}$aryl is optionally substituted with a halogen,
$X_3$ is represented by the following Formula 2:

[Formula 2]

in Formula 2,
$R_1$ is ester,
$R_2$ is $C_{1-20}$alkyl, and
a is an integer of 1 to 10, $X_4$ is represented by the following Formula 3:

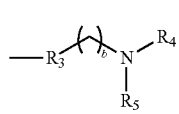

[Formula 3]

in Formula 3,
$R_3$ is $C_{1-6}$alkylene, ester, or $C_{6-10}$arylene,
$R_4$ and $R_5$ are each independently $C_{1-10}$alkyl, or are combined with each other to form a $C_{3-10}$ring structure, and
b is an integer of 1 to 8,
m, n, o and p represent a molar ratio of each repeating unit, where m+n+o+p is 100,
m is 1 to 50,
n is 0 to 50,
o is 1 to 50,
p is 1 to 70, and
$A_1$ to $A_4$ are each independently a hydrogen atom, or $C_{1-3}$alkyl,
wherein $X_1$ to $X_4$ are different from each other.

2. The polymer compound of claim 1, wherein in Formula 1, $X_1$ is $C_{1-10}$alkyl, ester or alkylaryl substituted with halogen.

3. The polymer compound of claim 1, wherein in Formula 1, $X_2$ is $C_{6-10}$aryl unsubstituted or substituted with $C_{1-3}$alkyl or $C_{3-10}$cycloalkyl.

4. The polymer compound of claim 1, wherein the polymer compound comprising the constituent unit represented by Formula 1 comprises a constituent unit represented by the following Formula 4 or Formula 5:

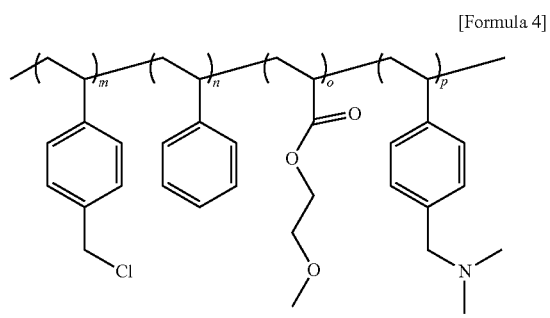

[Formula 4]

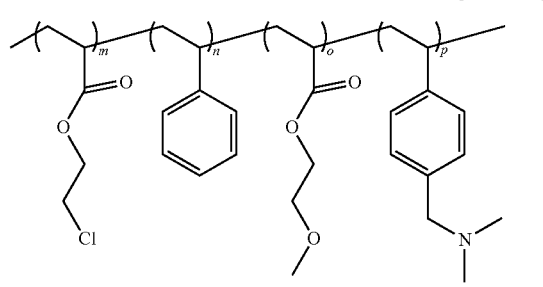

[Formula 5]

in Formula 4 and Formula 5,
m, n, o and p represent a molar ratio of each repeating unit, where m+n+o+p is 100,
m is 1 to 50,
n is 0 to 50,
o is 1 to 50, and
p is 1 to 70.

5. The polymer compound of claim 1, wherein the polymer compound is a modifier for a conjugated diene-based polymer.

6. A modified and conjugated diene-based polymer comprising a functional group derived from a polymer compound comprising a constituent unit represented by the following Formula 1:

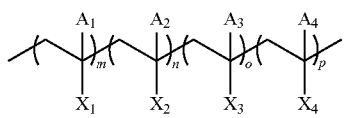
[Formula 1]

in Formula 1, $X_1$ and $X_2$ are each independently a derived substituent from a compound containing $C_{1-10}$alkyl, amine, ester, nitrile, benzophenone, acryl, vinyl, styrene, styrenacryl, or aryl, which is unsubstituted or substituted with at least one substituent selected from the group consisting of halogen, $C_{1-20}$alkyl, $C_{3-20}$cycloalkyl, and $C_{6-30}$aryl, wherein the $C_{1-20}$alkyl, $C_{3-20}$cycloalkyl, and $C_{6-30}$aryl is optionally substituted with a halogen, $X_3$ is represented by the following Formula 2:

[Formula 2]

in Formula 2, $R_1$ is ester, $R_2$ is $C_{1-20}$alkyl, and a is an integer of 0 to 10, $X_4$ is represented by the following Formula 3:

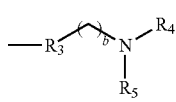
[Formula 3]

in Formula 3, $R_3$ is $C_{1-6}$alkylene, ester, or $C_{6-10}$arylene, $R_4$ and $R_5$ are each independently $C_{1-10}$alkyl, or are combined with each other to form a $C_{3-10}$ ring structure, and b is an integer of 1 to 8, m, n, o and p represent a molar ratio of each repeating unit, where m+n+o+p is 100, m is 1 to 50, n is 0 to 50, o is 1 to 50, p is 1 to 70, and $A_1$ to $A_4$ are each independently a hydrogen atom, or $C_{1-3}$alkyl.

7. The modified and conjugated diene-based polymer of claim 6, wherein the polymer compound comprising the constituent unit represented by Formula 1 comprises a constituent unit represented by the following Formula 4 or Formula 5:

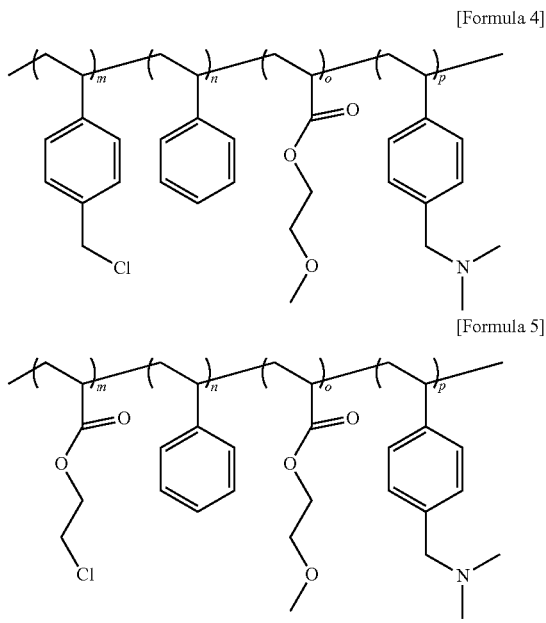
[Formula 4]

[Formula 5]

in Formula 4 and Formula 5, m, n, o and p represent a molar ratio of each repeating unit, where m+n+o+p is 100, m is 1 to 50, n is 0 to 50, o is 1 to 50, and p is 1 to 70.

8. The modified and conjugated diene-based polymer of claim 6, wherein the polymer comprises from 100 ppm to 10,000 ppm of a silane group based on a total amount of the polymer.

9. The modified and conjugated diene-based polymer of claim 6, wherein the polymer comprises 40 wt % or less of a derived unit from an aromatic vinyl-based monomer.

10. The modified and conjugated diene-based polymer of claim 6, wherein the polymer has a number average molecular weight of 10,000 g/mol to 1,000,000 g/mol.

11. A method for preparing the modified and conjugated diene-based polymer of claim 6, the method comprising:
1) polymerizing conjugated diene-based monomers, or an aromatic vinyl-based monomer and a conjugated diene-based monomer in the presence of an organo-alkali metal compound in a hydrocarbon solvent to prepare an active polymer in which an alkali metal is bonded to at least one terminal thereof;
2) reacting the active polymer with a polymer compound comprising a constituent unit represented by the following Formula 1 to obtain a first modified polymer; and
3) reacting the first modified polymer with a silane-based compound:

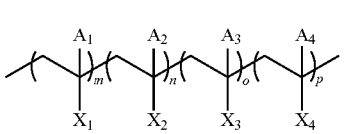
[Formula 1]

in Formula 1, $X_1$ and $X_2$ are each independently a derived substituent from a compound containing $C_{1-10}$alkyl, amine, ester, nitrile, benzophenone, acryl, vinyl, styrene, styrenacryl, or aryl, which is unsubstituted or substituted with at least one substituent selected from the group consisting of halogen, $C_{1-20}$alkyl, $C_{3-20}$cycloalkyl, and $C_{6-30}$aryl, wherein the $C_{1-20}$alkyl, $C_{3-20}$cycloalkyl, and $C_{6-30}$aryl is optionally substituted with a halogen, $X_3$ is represented by the following Formula 2:

$$—R_1-(CH_2CH_2O)_{\overline{a}}R_2 \quad \text{[Formula 2]}$$

in Formula 2,
$R_1$ is ester,
$R_2$ is $C_{1-20}$alkyl, and
a is an integer of 0 to 10, $X_4$ is represented by the following Formula 3:

$$—R_3\underset{b}{\frown}N\underset{R_5}{\overset{R_4}{|}} \quad \text{[Formula 3]}$$

in Formula 3,
$R_3$ is $C_{1-6}$alkylene, ester, or $C_{6-10}$arylene,
$R_4$ and $R_5$ are each independently $C_{1-10}$alkyl, or are combined with each other to form a $C_{3-10}$ ring structure, and
b is an integer of 1 to 8, m, n, o and p represent a molar ratio of each repeating unit, where m+n+o+p is 100,
m is 1 to 50,
n is 0 to 50,
o is 1 to 50,
p is 1 to 70, and
$A_1$ to $A_4$ are each independently a hydrogen atom, or $C_{1-3}$alkyl.

12. The method for preparing the modified and conjugated diene-based polymer of claim 11, wherein the polymer compound comprising the constituent unit represented by Formula 1 comprises a constituent unit represented by the following Formula 4 or Formula 5:

[Formula 4]

[Formula 5]

in Formula 4 and Formula 5,
m, n, o and p represent a molar ratio of each repeating unit, where m+n+o+p is 100,
m is 1 to 50,
n is 0 to 50,
o is 1 to 50, and
p is 1 to 70.

13. The method for preparing the modified and conjugated diene-based polymer of claim 11, wherein the organo-alkali metal compound is used in a molar ratio of 0.01 mmol to 10 mmol based on 100 g of a total of the monomers.

14. The method for preparing the modified and conjugated diene-based polymer of claim 11, wherein the polymerizing in step 1) is conducted by further adding a polar additive.

15. The method for preparing the modified and conjugated diene-based polymer of claim 14, wherein the polar additive is added in an amount of 0.001 parts by weight to 10 parts by weight based on 100 parts by weight of a total of the monomers.

16. The method for preparing the modified and conjugated diene-based polymer of claim 11, wherein the polymer compound is used in a molar ratio of 0.1 mol to 10 mol based on 1 mol of the organo-alkali metal compound.

17. The method for preparing the modified and conjugated diene-based polymer of claim 11, wherein the silane-based compound is used in a molar ratio of 0.001 mol to 10 mol based on 1 mol of the polymer compound.

18. The method for preparing the modified and conjugated diene-based polymer of claim 11, wherein the silane-based compound is any one selected from the group consisting of vinyl chlorosilane, vinyltrimethoxysilane, vinyltriethoxysilane, 2-(3,4-epoxycyclohexyl)ethyltrimethoxysilane, 3-glycidoxypropyltrimethoxysilane, 3-glycidoxypropylmethyldiethoxysilane, 3-glycidoxypropyldiethoxysilane, 3-glycidoxypropyltriethoxysilane, p-styryltrimethoxysilane, 3-methacryloxypropyltriethoxysilane, 3-methacryloxypropyltrimethoxysilane, 3-methacryloxypropylmethyldimethoxysilane, 3-methacryloxypropylmethyldiethoxysilane, 3-acryloxypropyltrimethoxysilane, N-2-(aminoethyl)-3-aminopropylmethyldimethoxysilane, N-2-(aminoethyl)-3-aminopropyltrimethoxysilane, N-2-(aminoethyl)-3-aminopropylmethyltriethoxysilane, 3-aminopropyltrimethoxysilane, 3-aminopropyltriethoxysilane, 3-triethoxysilyl-N-(1,3-dimethylbutylidene)propylamine, N-phenyl-3-aminopropyltrimethoxysilane, 3-chloropropyltrimethoxysilane, 3-mercaptopropylmethyldimethoxysilane, 3-mercaptopropyltrimethoxysilane, bis(triethoxysilylpropyl)tetrasulfide, and 3-isocyanatopropyltriethoxysilane, or a mixture of at least two thereof.

* * * * *